United States Patent
Li et al.

(10) Patent No.: US 8,120,413 B2
(45) Date of Patent: Feb. 21, 2012

(54) CHARGE PUMP CIRCUIT

(75) Inventors: Ming Li, Shanghai (CN); Qingyang Wu, Shanghai (CN); Liwu Yang, Shanghai (CN); Yangyuan Wang, Shanghai (CN)

(73) Assignee: Semiconductor Manufacturing International (Beijing) Corporation, Beijing (CN)

( * ) Notice: Subject to any disclaimer, the term of this patent is extended or adjusted under 35 U.S.C. 154(b) by 176 days.

(21) Appl. No.: 12/542,533

(22) Filed: Aug. 17, 2009

(65) Prior Publication Data
US 2010/0039167 A1    Feb. 18, 2010

(30) Foreign Application Priority Data

Aug. 18, 2008 (CN) .......................... 2008 1 0117972
Dec. 12, 2008 (CN) .......................... 2008 1 0172764

(51) Int. Cl.
*G05F 3/16* (2006.01)
*H02M 3/155* (2006.01)
(52) U.S. Cl. ......................................... 327/536; 363/60
(58) Field of Classification Search .................. None
See application file for complete search history.

(56) References Cited

U.S. PATENT DOCUMENTS

| | | | | |
|---|---|---|---|---|
| 6,107,864 | A * | 8/2000 | Fukushima et al. | 327/536 |
| 6,501,325 | B1 * | 12/2002 | Meng | 327/536 |
| 6,812,776 | B2 * | 11/2004 | Henry | 327/536 |
| 7,116,156 | B2 * | 10/2006 | Myono et al. | 327/536 |
| 7,560,910 | B2 * | 7/2009 | Hata et al. | 323/222 |
| 7,583,132 | B2 * | 9/2009 | Conte et al. | 327/536 |

FOREIGN PATENT DOCUMENTS

| | | |
|---|---|---|
| CN | 1256554 A | 6/2000 |
| CN | 1331862 A | 1/2002 |
| CN | 1819422 A | 8/2006 |

* cited by examiner

*Primary Examiner* — Lincoln Donovan
*Assistant Examiner* — Terry L Englund
(74) *Attorney, Agent, or Firm* — Squire Sanders (US) LLP

(57) ABSTRACT

A charge pump circuit includes a switch unit adapted to transmit charges from the input of the charge pump to the output of the charge pump; a transmission unit adapted to control turn-on or cut-off of an MOS transistor in the switch unit; and a charging unit in one-to-one correspondence with a PMOS transistor in the switch unit and adapted to store charges to boost the transmission voltage. A first NMOS transistor and at least two PMOS transistor are used as the switch unit during transmission of the charges, so that normal work can be enabled with high transmission efficiency in the case of a low source voltage.

13 Claims, 7 Drawing Sheets

CHARGE PUMP CIRCUIT

This application claims priority to Chinese Patent Application No. 200810117972.3, filed with the Chinese Patent Office on Aug. 18, 2008 and entitled "CHARGE PUMP CIRCUIT", which is hereby incorporated by reference in its entirety.

This application claims the priority of Chinese Patent Application No. 200810172764.3, filed Dec. 12, 2008, the entire disclosure of which is incorporated herein by reference.

FIELD OF THE INVENTION

The present invention relates to a charge pump circuit.

BACKGROUND OF THE INVENTION

The device size becomes smaller and smaller and the chip integration level becomes higher and higher along with continuous development of semiconductor process. By the scaling-down theory, the source voltage VDD of a chip also becomes increasingly lower along with the process. However, a high voltage circuit or a high voltage device still may be used in the chip due to a system demand or a need for improved chip performance. In order to realize integration, usually a charge pump circuit is introduced to boost the source voltage VDD to a high voltage for internal use.

Referring to FIG. 1, a four-stage Dickson charge pump is illustrated, which consists of five NMOS transistors M1, M2, M3, M4 and M5, four charging capacitors C1, C2, C3 and C4, and a storage capacitor Cf. The gate of each NMOS transistor is coupled with its drain, the output terminal of each NMOS transistor is coupled with one terminal of a charging capacitor and the input terminal of the next NMOS transistor, the input terminal of the first NMOS transistor M1 is coupled with the input voltage VDD, and the output terminal of the last NMOS transistor is coupled with the storage capacitor Cf. The other terminal of an odd stage of charging capacitor is coupled with a first clock signal CLK, and the other terminal of an even stage of charging capacitor is coupled with a second clock signal CLKB. The other terminal of the storage capacitor Cf is grounded.

Referring to FIG. 2, FIG. 2 illustrates a diagram of the first clock signal CLK and the second clock signal CLKB varying with time, where the first clock signal CLK and the second clock signal CLKB provide voltage signals with a square wave shape and with a magnitude between 0 and the VDD, and the first clock signal CLK and the second clock signal CLKB are anti-phase clocks signals. When the first clock signal CLK is at the VDD, the second signal CLKB is at 0V, and when the first clock signal CLK is at 0V, the second signal CLKB is at the VDD.

Referring to FIG. 1, an initial voltage on capacitor C1 is 0 when the first clock signal CLK is at 0V. At this time, the transistor M1 is turned on, and thus the charging capacitor C1 is charged with the input voltage VDD until the voltage on capacitor C1 is at the VDD. When the first clock signal CLK is at the VDD, the voltage of the other terminal of the charging capacitor C1 is boosted to two times the VDD because the voltage on capacitor C1 is kept stable. Similarly, the voltage can be boosted with the VDD each time it passes through a charge pump including a NMOS transistor and a charging capacitor. Finally, the output voltage Vout with an increase of four times the VDD relative to the input voltage is provided stably through the storage capacitor Cf.

In the above circuit, each NMOS transistor with the gate and the source in connection may give rise to a loss of threshold voltage, and this may reduce the voltage gain of the charge pump circuit, lower transmission efficiency of the charge pump circuit and further increase area of the circuit. Also each stage of transmission unit may be insufficiently turned on along with the steadily lowered VDD, thereby influencing the efficiency of boosting the voltage through the charge pump.

Furthermore, the threshold voltage is also related to the substrate source voltage, and since the output voltage of each NMOS transistor differs from those of several preceding transistors, the threshold voltage of each transmission unit also differs. Even if the minimum gate-source voltage required for turning on each NMOS transistor differs and although several preceding NMOS transistors can be turned on thoroughly, the turn-on of the NMOS transistors may become more and more insufficient and seriously even an NMOS transistor in a transmission unit may fail to be turned on along with the increment of the numbers of transistors, thereby influencing normal work of the entire circuit.

Another modified Dickson charge pump circuit is disclosed in the prior art. As illustrated in FIG. 3, the charge pump consists of (m+1) stages of transmission units (where m≧1), m stages of charging units and an energy storage unit Cf.

Taking the first stages of transmission unit as an example, the first stage of transmission unit includes three PMOS transistors $Q_{T1}$, $Q_{S1}$ and $Q_{D1}$, where the gate and the drain of the first PMOS transistor $Q_{T1}$ are coupled with the gate of the second PMOS transistor $Q_{S1}$ and the drain of the third PMOS transistor $Q_{D1}$; the source of the first PMOS transistor $Q_{T1}$ is coupled with the source of the second PMOS transistor $Q_{S1}$ and the gate of the third PMOS transistor $Q_{D1}$; the substrate of the first PMOS transistor $Q_{T1}$ is coupled with the substrate and the drain of the second PMOS transistor $Q_{S1}$ and the substrate and the source of the third PMOS transistor $Q_{D1}$.

Except for the first and the last stages of transmission units, the gate and the drain of the first PMOS transistor in any other stage of transmission unit act as the output of the transmission unit, which is coupled with one terminal of a charging unit and the source of the first PMOS transistor in the next stage of transmission unit; the source of the first PMOS transistor $Q_{T1}$ in the first stage of transmission unit is coupled with an input voltage VDD; and the gate and the drain of the first PMOS transistor in the last stage of transmission unit act as the output of the last stage of transmission unit, which is coupled with one terminal of the energy storage unit Cf The charging unit and the energy storage unit Cf consist of capacitors. The other terminal of the odd stage of charging unit is coupled with the first clock signal CLK, and the other terminal of the even stage of charging unit is coupled with the second clock signal CLKB.

In this modified Dickson charge pump circuit, the substrate source voltage is made substantially stable by coupling two bias PMOS transistors at the substrate, thereby avoiding the occurrence of a phenomenon that an MOS transistor fail to be turned on due to a too large threshold voltage. However, this structure can not ensure sufficient turn-on of the PMOS transistors in all the transmission units in the case of a low input voltage VDD and may be inefficient with boosting the voltage at each stage. The inefficiency of transferring may require a circuit with a larger number of stages, thereby resulting in a slowed processing speed, more noise and an increased chip area of the circuit.

SUMMARY OF THE INVENTION

An object of the invention is to provide a charge pump circuit which can still work normally with high transmission efficiency while a low input voltage is applied thereto.

An aspect of the invention provides a charge pump circuit including:

a switch unit adapted to transmit charges from the input of the charge pump to the output of the charge pump and including a first NMOS transistor and at least two in-series coupled PMOS transistors, in which, the output terminal of the first NMOS transistor is coupled with the input terminal of the first PMOS transistor, the input terminal of the first NMOS transistor is the input of the charge pump circuit, and the output terminal of the last PMOS transistor is the output of the charge pump circuit;

a transmission unit adapted to control turn-on and cut-off of the MOS transistors in the switch unit and including at least two transmission sub-units connected in series, in which, the first transmission sub-unit is adapted to control turn-on or cut-off of the first NMOS transistor and the first PMOS transistor in the switch unit, and the other transmission sub-units are sequentially in one-to-one correspondence with the other PMOS transistors in the switch unit and control turn-on or cut-off of the corresponding PMOS transistor; and at least two stages of charging units adapted to store charges to boost a transmission voltage, in which each stage of charging unit is in one-to-one correspondence with the PMOS transistor in the switch unit. Optionally, each stage of charging unit has one terminal coupled with the input terminal of the corresponding PMOS transistor and the other terminal alternatively coupled with a first clock signal or a second clock signal.

Optionally, the first clock signal and the second clock signal are anti-phase clock signals, and voltage peaks of the first clock signal and the second clock signal are the same as a value by which the transmission voltage is boosted.

Optionally, in the charging units, the other terminals of odd stage of charging units are coupled with the first clock signal, and the other terminals of even stage of charging units are coupled with the second clock signal.

Optionally, each stage of charging unit includes a charging capacitor or a parallel combination of a plurality of charging capacitors or a serial combination of a plurality of charging capacitors or a serial and parallel combination of a plurality of charging capacitors.

Optionally, each stage of transmission sub-unit includes a first input, a second input, a third input and an output; in the first stage of transmission sub-unit, the first input is coupled with the input terminal of the first PMOS transistor and the output terminal of the first NMOS transistor in the switch unit, the second input is coupled with the output terminal of the first PMOS transistor in the switch unit, the third input is coupled with a second clock signal, and the output is coupled with the gate of the first NMOS transistor and the gate of the first PMOS transistor in the switch unit; and in the other stages of transmission sub-units, the first input is coupled with the input terminal of the corresponding PMOS transistor in the switch unit, the second input is coupled with the output terminal of the corresponding PMOS transistor in the switch unit, the third input is coupled with the first input of the preceding stage of transmission sub-unit, and the output is coupled with the gate of the corresponding PMOS transistor in the switch unit.

Optionally, the transmission sub-unit at least includes an NMOS transistor and a PMOS transistor; in which, the gate of the PMOS transistor is coupled with the gate of the NMOS transistor and acts as the first input of the transmission sub-unit; the substrate of the PMOS transistor is coupled with the input terminal thereof and acts as the second input of the transmission sub-unit; the input terminal of the NMOS transistor acts as the third input of the transmission sub-unit; the output terminal of the NMOS transistor is coupled with the output terminal of the PMOS transistor and acts as the output of the transmission sub-unit; and the substrate of the NMOS transistor is grounded.

Optionally, the switch unit further includes substrate bias units, each of which is sequentially in one-to-one correspondence with the PMOS transistor in the switch unit and adapted to avoid presence of leakage current in the corresponding PMOS transistor.

Optionally, the substrate bias unit includes a bias PMOS transistor with the gate coupled with the input terminal of the corresponding PMOS transistor in the switch unit, with the input terminal and the substrate coupled with the substrate of the corresponding PMOS transistor in the switch unit, and with the output terminal coupled with the output terminal of the corresponding PMOS transistor in the switch unit.

Optionally, the substrate bias unit includes a first bias PMOS transistor and a second bias PMOS transistor, in which, the gate of the first bias PMOS transistor, the output terminal of the second bias PMOS transistor are coupled with the output terminal of the corresponding PMOS transistor in the switch unit, the substrate terminal and the input terminal of the first bias PMOS transistor, the substrate and the input terminal of the second bias PMOS transistor are coupled with the substrate of the corresponding PMOS transistor in the switch unit, the output terminal of the first bias PMOS transistor, the gate of the second bias PMOS transistor are coupled with the input terminal of the corresponding PMOS transistor in the switch unit. Optionally, there is further included an energy storage unit connected side by side with the output of the charge pump circuit and adapted to provide stably an output voltage.

Optionally, the energy storage unit includes a grounded capacitor or a parallel combination of a plurality of grounded capacitors or a serial combination of a plurality of grounded capacitors with one terminal grounded or a serial and parallel combination of a plurality of grounded capacitor.

Optionally, the energy storage unit further includes a match resistance coupled in parallel with the capacitor or the combination of capacitors.

Optionally, the input terminal of the MOS transistor is the source of the MOS transistor, and the output terminal of the MOS transistor is the drain of the MOS transistor, or the input terminal of the MOS transistor is the drain of the MOS transistor, and the output terminal of the MOS transistor is the source of the MOS transistor.

The invention further provides a charge pump circuit including:

a switch unit adapted to transmit charges from the input of the charge pump circuit to the output of the charge pump and including a first NMOS transistor and a PMOS transistor, in which, the output terminal of the first NMOS transistor is coupled with the input terminal of the PMOS transistor, the input terminal of the first NMOS transistor is the input terminal of the charge pump circuit, and the output terminal of the PMOS transistor is the output of the charge pump circuit;

a transmission unit adapted to control turn-on or cut-off of the first NMOS transistor and the PMOS transistor in the switch unit; and a charging unit adapted to store charges to boost a transmission voltage.

Optionally, the charging unit has one terminal coupled with the input terminal of the corresponding PMOS transistor and the other terminal alternatively coupled with a first clock signal.

Optionally, the transmission unit includes a first input, a second input, a third input and an output; the first input is coupled with the input terminal of the PMOS transistor and the output terminal of the first NMOS transistor in the switch unit, the second input is coupled with the output terminal of the PMOS transistor in the switch unit, the third input is coupled with a second clock signal, and the output is coupled with the gate of the first NMOS transistor and the gate of the PMOS transistor in the switch unit.

Optionally, the switch unit further includes a substrate bias unit in correspondence with the PMOS transistor in the switch unit and adapted to avoid presence of leakage current in the corresponding PMOS transistor.

Optionally, there is further included an energy storage unit connected side by side with the output of the charge pump circuit and adapted to provide stably an output voltage.

As compared with the prior art, the embodiment of the invention adopts the first NMOS transistor and at least one PMOS transistor as the switch unit during transmission and thus can address effectively the problem that the all-NMOS transistor circuit may have degraded transmission efficiency and even can not work because the threshold voltage of the NMOS transistor increases due to the body effect in the circuit, and also can ensure that the respective MOS transistors will be provided with a high turn-on voltage, for example, two times the input voltage VDD, and thus the circuit can still work normally even in the case of a low input voltage VDD.

DETAILED DESCRIPTION OF THE INVENTION

Figure 1:
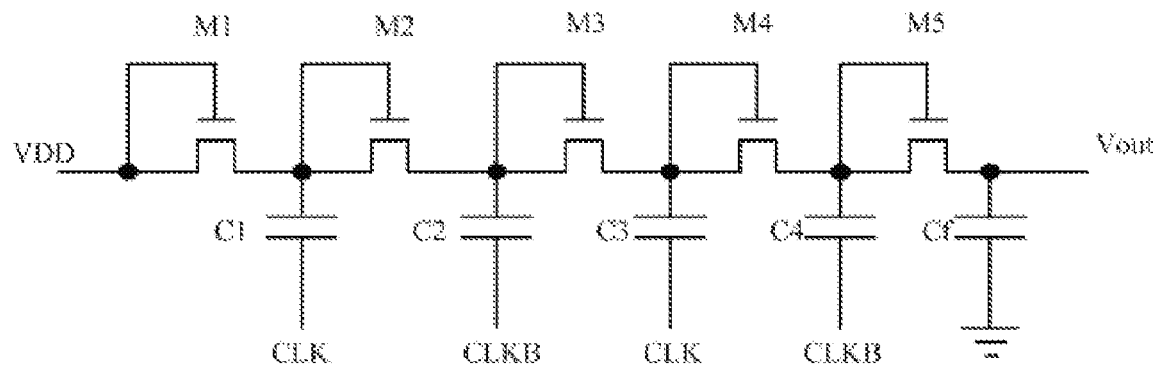
FIG. 1 illustrates a schematic diagram of a charge pump circuit known in the prior art.

An embodiment of the invention provides a charge pump circuit, where the combination of a first NMOS transistor and at least one PMOS transistor is adopted in a switch unit, and at least one stage of transmission sub-unit is in one-to-one correspondence with the MOS transistor in the switch unit, which controls turn-on or cut-off of the MOS transistors in the switch unit, is adopted in a transmission unit. The charge pump circuit according to the embodiment of the invention ensures that the turn-on voltage of each MOS transistor in the switch unit is two times the VDD, so that such a problem can be addressed that when each switch unit is an NMOS transistor, a threshold voltage of turning on the NMOS transistor may increase easily along with the increasing number of stage of the charge pump, thereby influencing the work of the circuit, and such a situation can be avoided that when each switch unit is an PMOS transistor, not all the PMOS transistors can be provided with a high turn-on voltage, e.g., two times the input voltage, thereby resulting in a possibility of failing with turn-on when the input voltage is low.

An embodiment of the invention provides a charge pump circuit including:

a switch unit adapted to transmit charges from the input of the charge pump to the output of the charge pump, including a first NMOS transistor and at least two in-series coupled PMOS transistors, the output terminal of the first NMOS transistor is coupled with the input terminal of the first PMOS transistor, the input terminal of the first NMOS transistor is the input of the charge pump circuit, and the output terminal of the last PMOS transistor is the output of the switch circuit;

a transmission unit adapted to control turn-on or cut-off of the MOS transistors in the switch unit, including at least two stages of transmission sub-units coupled in series, in which, the first stage of transmission sub-unit is adapted to control turn-on or cut-off of the first NMOS transistor and the first PMOS transistor in the switch unit, and the other stages of transmission sub-units sequentially in one-to-one correspondence with the other PMOS transistors in the switch unit and control turn-on or cut-off of the corresponding PMOS transistor; and at least two stages of charging units adapted to store charges to boost a transmission voltage, in which each stage of charging unit is in one-to-one correspondence with the PMOS transistors in the switch unit.

Specifically, each stage of charging unit has one terminal coupled with the input terminal of the corresponding PMOS transistor in the switch unit and the other terminal alternatively coupled with a first clock signal or a second clock signal.

Where the odd stage of charging units, e.g., the first stage of charging unit, the third stage of charging unit, the fifth stage of charging unit, etc., have the other terminals coupled with the first clock signal, and the even stages of charging units, e.g., the second stage of charging unit, the fourth stage of charging unit, the sixth stage of charging unit, etc., have the other terminals coupled with the second clock signal.

Where each level of charging unit includes a charging capacitor or a parallel combination of a plurality of charging capacitors or a serial combination of a plurality of charging capacitors or a serial and parallel combination of a plurality of charging capacitors.

Specifically, each stage of transmission sub-unit includes a first input, a second input, a third input and an output;

in which, in the first stage of transmission sub-unit, the first input of the first stage is coupled with the input terminal of the first PMOS transistor and the output terminal of the first NMOS transistor in the switch unit, the second input is coupled with the output terminal of the first PMOS transistor in the switch unit, the third input is coupled with the second clock signal, and the output is coupled with the gate of the first NMOS transistor and the gate of the first PMOS transistor in the switch unit;

in which, in the other stages of transmission sub-units, the first input is coupled with the input terminal of the corresponding PMOS transistor in the switch unit, the second input is coupled with the output terminal of the corresponding PMOS transistor in the switch unit, the third input is coupled with the first input of the preceding stage of transmission sub-unit, and the output is coupled with the gate of the corresponding PMOS transistor in the switch unit.

Specifically, each stage of transmission sub-unit at least includes an NMOS transistor and a PMOS transistor. Where the gate of the PMOS transistor is coupled with the gate of the NMOS transistor and acts as the first input of the transmission sub-unit; the substrate of the PMOS transistor is coupled with the input terminal thereof and acts as the second input of the transmission sub-unit; the input terminal of the NMOS transistor acts as the third input of the transmission sub-unit; the output terminal of the NMOS transistor is coupled with the output terminal of the PMOS transistor and acts as the output of the transmission sub-unit; and the substrate of the NMOS transistor is grounded.

An embodiment of the invention further provides a charge pump circuit including:

a switch unit adapted to transmit charges from the input of the charge pump to the output of the charge pump, including a first NMOS transistor and a PMOS transistor, in which the output terminal of the first NMOS transistor is coupled with the input terminal of the PMOS transistor, the input terminal of the first NMOS transistor is the input of the charge pump circuit, and the output terminal of the PMOS transistor is the output of the charge pump circuit;

a transmission unit adapted to control turn-on or cut-off of the first NMOS transistor and the PMOS transistor in the switch unit; and a charging unit adapted to store charges to boost a transmission voltage.

Specifically, the charging unit has one terminal coupled with the input terminal of the corresponding PMOS transistor and the other terminal alternatively coupled with a first clock signal. The charging unit can include a charging capacitor or a parallel combination of a plurality of charging capacitors or a serial combination of a plurality of charging capacitors or a serial and parallel combination of a plurality of charging capacitors.

Specifically, the transmission unit can include a first input, a second input, a third input and an output; in which, the first input is coupled with the input terminal of the PMOS transistor and the output terminal of the first NMOS transistor in the switch unit, the second input is coupled with the output terminal of the PMOS transistor in the switch unit, the third input is coupled with a second clock signal, and the output is coupled with the gate of the first NMOS transistor and the gate of the PMOS transistor in the switch unit.

Where the transmission unit at least includes an NMOS transistor and a PMOS transistor. In the transmission unit, the gate of the PMOS transistor is coupled with the gate of the NMOS transistor and acts as the first input of the transmission unit; the substrate of the PMOS transistor is coupled with the input terminal thereof and acts as the second input of the transmission unit; the input terminal of the NMOS transistor acts as the third input of the transmission unit; the output terminal of the NMOS transistor is coupled with the output terminal of the PMOS transistor and acts as the output of the transmission unit; and the substrate of the NMOS transistor is grounded.

The first clock signal and the second clock signal are anti-phase clock signals, and the voltage peaks of the first clock signal and the second clock signal are the same as a magnitude by which the transmission voltage is boosted.

The input terminal of any MOS transistor as mentioned above may be the gate or the drain thereof, and the output terminal may be the drain or the source thereof.

Embodiments of the invention will be detailed below with reference to the drawings and the embodiments thereof.

The First Embodiment

Figure 4:
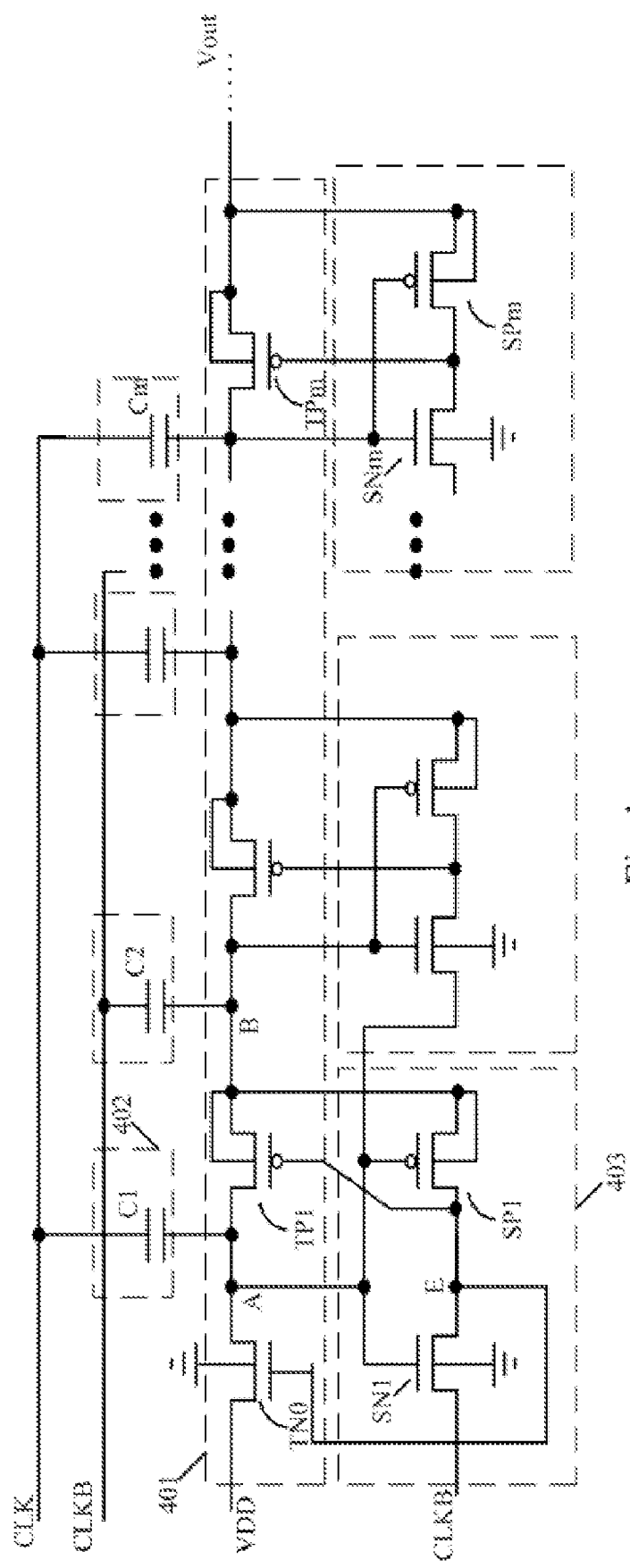
FIG. 4-7 illustrates a schematic diagram of several embodiments of a charge pump circuit according to the invention.

Referring to FIG. 4, an embodiment of the invention provides a charge pump circuit including: a switch unit 410 including a first NMOS transistor TN0 and m PMOS transistors TPi (in which, $1 \leq i \leq m$, $m \geq 1$); m stages of charging units each including a charging capacitor Ci; and a transmission unit including m stages of transmission sub-units each including an NMOS transistor and a PMOS transistor.

In the switch unit 401, the output terminal of each PMOS transistor is coupled with the input terminal of the next PMOS transistor, the substrate of the each PMOS transistor is coupled with the output terminal, and the output terminal of the first NMOS transistor is coupled with the input terminal of the first PMOS transistor TP1.

In each stage of the transmission sub-unit, taking the first stage of transmission sub-unit 403 as an example, the gate of the NMOS transistor SN1 is coupled with the gate of the PMOS transistor SP1 and acts as the first input of the transmission sub-unit 403; the substrate of the PMOS transistor SP1 is coupled with the input terminal thereof and acts as the second input of the transmission sub-unit 403; the input terminal of the NMOS transistor SN1 acts as the third input of the transmission sub-unit 403; and the output terminal of the PMOS transistor SP1 is coupled with the output terminal of the NMOS transistor SN1 and acts as the output of the transmission sub-unit 403.

In the first stage of transmission sub-unit 403, the first input is coupled with the output terminal of the first NMOS transistor TN0, the input terminal of the first PMOS transistor TP1 in the switch unit 401 and one terminal of the first stage of charging unit 402 (at the junction A); the second input of the first stage of transmission sub-unit 403 is coupled with the output terminal and the substrate of the first PMOS transistor TP1 in the switch unit 401 (at the junction B); the third input of the first stage of transmission sub-unit 403 is coupled with the second clock signal CLKB; and the output of the first stage of transmission sub-unit 403 is coupled with the gate of the first NMOS transistor TN0 and the gate of the first PMOS transistor TP1 in the switch unit 401 (at the junction E).

Figure 2:
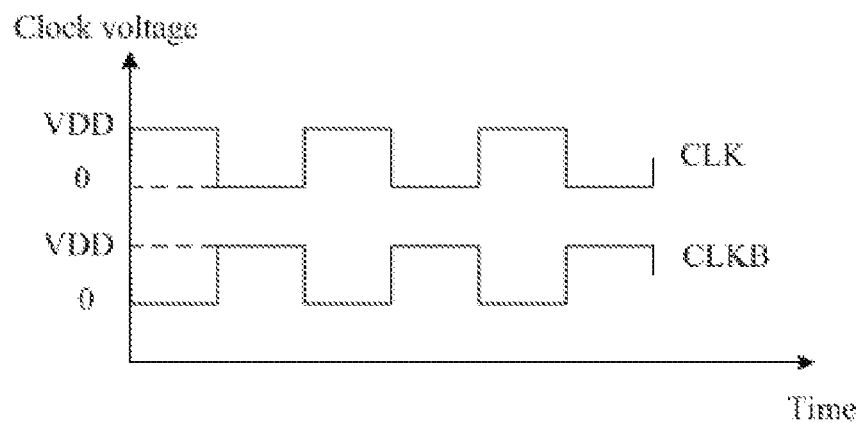
FIG. 2 illustrates a schematic diagram of a clock voltage varying with time.

One terminal of the charging capacitor C1 in the first stage of charging unit 402 is coupled with the output terminal of the first NMOS transistor TN0, the input terminal of the first PMOS transistor in the switch unit 401 and the first input of the first stage of transmission sub-unit 403; and the other terminal of the charging capacitor C1 in the first stage of charging unit is coupled with the first clock signal CLK.

Where the first clock signal CLK and the second clock signal CLKB may be square-wave anti-phase voltage signals, and referring to FIG. 2, the first clock signal CLK and the second clock signal CLKB have a peak voltage of VDD, which is an input voltage to the charge pump circuit in normal work.

Referring to FIG. 4, in the case of stable work in this embodiment, when the first clock signal CLK is at 0V and the second clock signal CLKB is at the VDD, ideally there is a voltage difference of VDD across the charging capacitor C1, and the junction A is at the VDD and the junction B is at a voltage which is three times the VDD. The NMOS transistor SN1 and the PMOS transistor SP1 in the first transmission sub-unit 403 constitute an inverter, and at this time the NMOS transistor SN1 is cut off and the PMOS transistor SP1 is turned on, so that the junction E is at the same voltage as the junction B, which is three times the VDD. Therefore, the voltage difference between the gate and the input terminal of the first NMOS transistor TN0 in the switch unit 401 is 2 VDD, and when 2 VDD is larger than a threshold voltage $V_{TN0}$ of turning on the TN0, the first NMOS transistor TN0 is turned on, and charges are transmitted from the input terminal of the first NMOS transistor TN0 to the junction A, so that the junction A is at the same voltage of VDD as the input terminal of the first NMOS transistor TN0. At this time, the first PMOS transistor TP1 is cut off because the junction E is at a voltage which is three times the VDD. The TP1 is in a cut-off status, thereby avoiding transmission back of the current, which may influence transmission.

When the first clock signal is at the VDD and the second clock signal CLKB is at 0V, the charging capacitor C1 holds a voltage difference of VDD, and the charging capacitor C2 holds a voltage difference which is two times the VDD, so that the junction A is at a voltage which is two times the VDD, and the junction B is at a voltage which is two times the VDD. At this time, the PMOS transistor SP1 in the first stage of transmission sub-unit 403 is cut off, and the NMOS transistor SN1 is turned on, so that the junction E is at the same voltage as the second clock signal CLKB. Therefore, the first NMOS transistor TN0 in the switch unit 401 is cut off, the first PMOS transistor TP1 is turned on, and charges are transmitted from the junction A to the junction B, so that the junction B is at the same voltage as the junction A.

Thereafter, each of the PMOS transistors sequentially coupled in series works in a similar process as the first PMOS transistor. Similarly, the corresponding PMOS transistor in the switch unit can be turned on by the voltage provided from each stage of transmission sub-unit, and the output voltage will be boosted by the VDD upon each transmission of charges through one PMOS transistor in the switch unit and the action from the corresponding charging capacitor. Therefore, the source voltage VDD is input to the input terminal of the first NMOS transistor TN0 in the switch unit 401 and transmitted to the output terminal of the last PMOS transistor TPm for output, and the voltage will be boosted to (m+1) times the VDD if the switch unit includes m PMOS transistors. Furthermore since each stage of transmission sub-unit provides the corresponding PMOS transistor in the switch unit 401 with a different voltage by the clock signal and the corresponding PMOS transistor is turned on sequentially, charges will be transmitted in only one direction.

The threshold voltage of turning on the MOS transistor has been omitted in the above analysis of the junction voltages during turning on or cutting off the MOS transistor for convenient descriptions. Indeed during practical work, when the first NMOS transistor TN0 in the switch unit 401 is turned on, the junction A is actually at a voltage which is the difference between the voltage at the input terminal of the first NMOS transistor TN0 and the threshold voltage $V_{TN0}$ of turning on the TN0, i.e., VDD–$V_{TN0}$. When the first NMOS transistor TN0 is cut off and the first PMOS transistor TP1 is turned on, the junction B is actually at a voltage which is the difference between the voltage at the junction A and the threshold voltage $V_{TP1}$ of turning on the TP1, i.e., (2*VDD–$V_{TN0}$–$V_{TP1}$). Similarly, when the input voltage VDD is input to the input terminal of the first NMOS transistor TN0 in the switch unit 401 and transmitted to the output terminal of the last PMOS transistor TPm for output, the output voltage is actually $$\left( (m+1)*VDD - V_{TN0} - \sum_{i=1}^{m} V_{TPi} \right),$$

where $V_{TN0}$ is the threshold voltage of the TN0, and $V_{TP1}$ is the threshold voltage of the TPi.

It should be noted that in practical work, each stage of transmission sub-unit is adapted to provide an turn-on voltage to turn on the corresponding PMOS transistor in the switch unit, but the provided turn-on voltage may not be exactly two times the VDD due to a parasitic capacitor in the MOS transistor, etc. For example, when the NMOS transistor SN1 in the first stage of transmission unit is cut off and the PMOS transistor SP1 is turned on, the junction E is actually at a voltage which is the difference between the voltage at the junction B and ΔV with a magnitude determined by parameters of a parasitic element. However, the magnitude of ΔV is typically very small and thus has no influence upon turn-on of the transistor, so that the turn-on voltage can be considered two times the VDD in the present specification.

In the embodiment of the invention, the adoption of the serial combination of one NMOS transistor TN0 and a plurality of PMOS transistors as the switch unit ensures the turn-on voltage of each MOS transistor to be two times the VDD, so that each MOS transistor can be turned on sufficiently, and thereby ensuring normal work of the charge pump circuit.

Specifically, the first NMOS transistor is firstly adopted for the switch unit to ensure that the NMOS transistor can be turned on sufficiently and the circuit can work normally in the case of a low input voltage. Next, a plurality of PMOS transistors coupled in series with the first NMOS transistor are adopted for the switch unit; and since the PMOS transistors are formed in n-wells of P-type semiconductor substrate and the voltages in the wells are adjustable, the substrate source voltage of the PMOS transistors is at 0V, i.e., $V_{DS}$=0, and further to say, the threshold of turn-on voltage will not increase along with the increasing number of stage. Therefore, the circuit structure of the embodiment of the present invention causes all the turn-on voltages of the first NMOS transistor and each of the PMOS transistors in the switch unit are two times the VDD, and thus each MOS transistor can be turned on sufficiently even if the VDD is very low to thereby ensure normal work of the circuit.

Furthermore in the embodiment of the invention, the turn-on voltage of each MOS transistor in each transmission sub-unit is also two times the VDD to thereby effectively ensure stable work of the entire circuit.

In another embodiment of the invention, the switch unit can further include a plurality of substrate bias units, each of which is sequentially in one-to-one correspondence with a PMOS transistor in the switch unit and adapted to avoid presence of leakage current in the corresponding PMOS transistor.

In an embodiment, each substrate bias unit can include a first bias PMOS transistor and a second bias PMOS transistor, which are coupled with each other, and each substrate bias unit is sequentially in one-to-one correspondence with a PMOS transistor in the switch unit.

Figure 5:
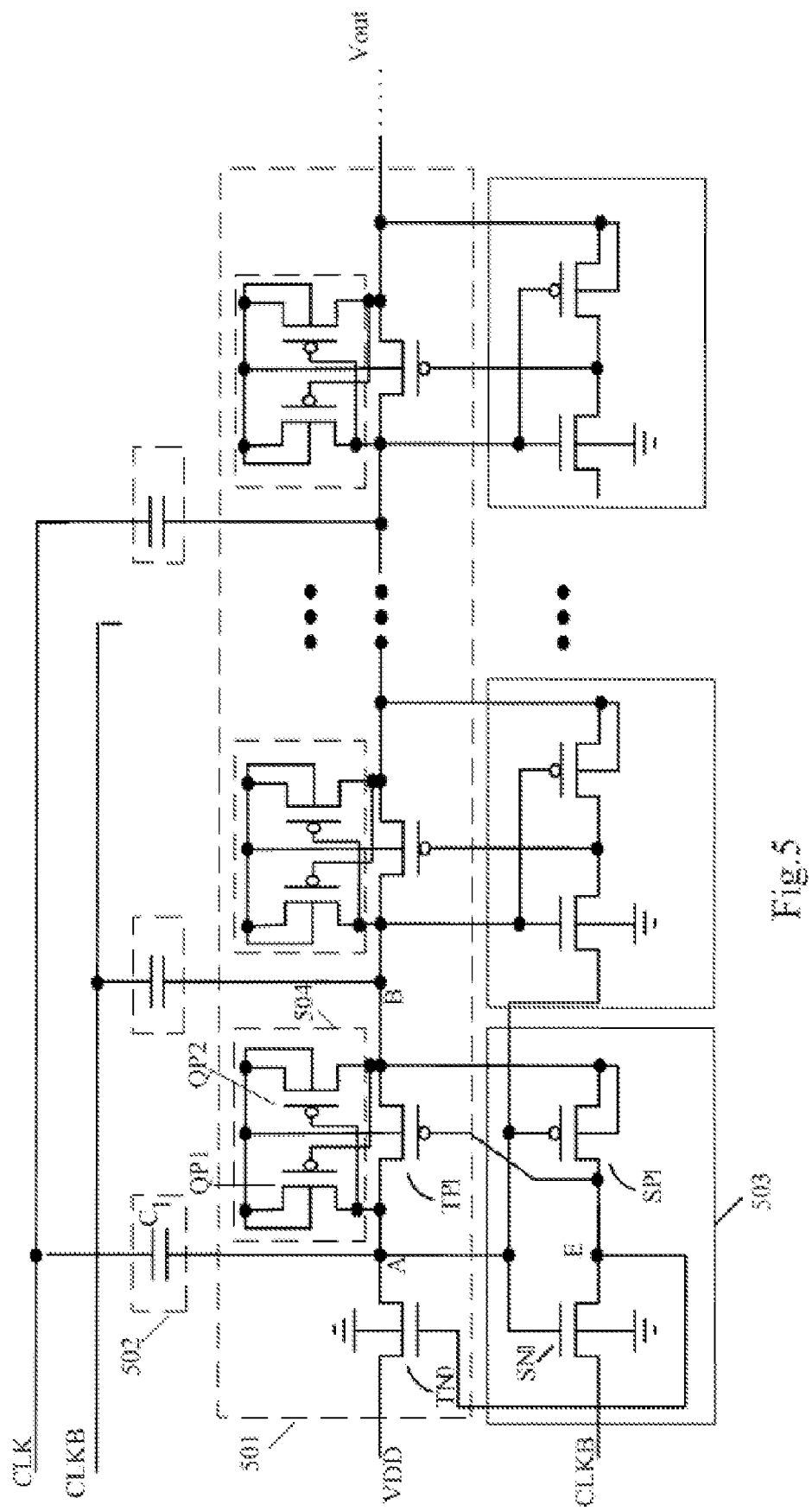

Referring to FIG. 5, a first substrate bias unit 504 is taken as an example. Specifically, the first substrate bias unit 504 includes a first bias PMOS transistor QP1 and a second bias PMOS transistor QP2, in which, the gate of the first bias PMOS transistor QP1 and the output terminal of the second bias PMOS transistor QP2 are coupled with the output terminal of the first PMOS transistor TP1 in the switch unit 501, the gate of the second bias PMOS transistor QP2 and the input terminal of the first bias PMOS transistor QP1 are coupled with the input terminal of the first PMOS transistor TP1 in the switch unit 501, the substrate and the output terminal of the first bias PMOS transistor QP1 and the substrate and the input terminal of the second bias PMOS transistor QP2 are coupled with the substrate of the first PMOS transistor TP1 in the switch unit 501.

When a first clock signal CLK is at 0V and a second clock signal CLKB is at the VDD, the point A in FIG. 5 is at a voltage of VDD, and the point B is at a voltage which is three times the VDD, the first bias PMOS transistor QP1 in the first substrate bias unit 504 is cut off, and the second bias PMOS transistor QP2 in the first substrate bias unit 504 is turned on, and therefore when the first PMOS transistor TP1 in the switch unit 501 is in a cut-off status, the substrate voltage of the TP1 is higher than the voltage at the point B by a threshold voltage $V_{QP1}$ of turning on the first bias PMOS transistor QP1. When the first clock signal CLK is at the VDD and the second clock signal CLKB is at 0V, the point A is at a voltage which is two times the VDD, and the point B is at a voltage which is two times the VDD. At this time, both the first bias PMOS transistor QP1 and the second bias PMOS transistor QP2 in the first substrate bias unit 504 are in a cut-off status, so that when the first PMOS transistor TP1 in the switch unit 501 is in a turn-on status, the substrate potential of the TP1 is higher than the voltage at the point A by the threshold voltage $V_{QP1}$ of turning on the first bias PMOS transistor QP1. That is, regardless of whether the first PMOS transistor TP1 in the switch unit 501 is in a cut-off or turn-on status, the substrate potential thereof is always higher than the potential of the input terminal, thereby avoiding the occurrence of leakage current in the TP1, which may influence transmission efficiency of the circuit.

Each of the other substrate bias units is sequentially in one-to-one correspondence with the PMOS transistors in the switch unit works in a similar process, and therefore the substrate bias unit can avoid the occurrence of leakage current between the source and drain and the substrate of the PMOS transistor to thereby improve transmission efficiency of the circuit.

Figure 6:
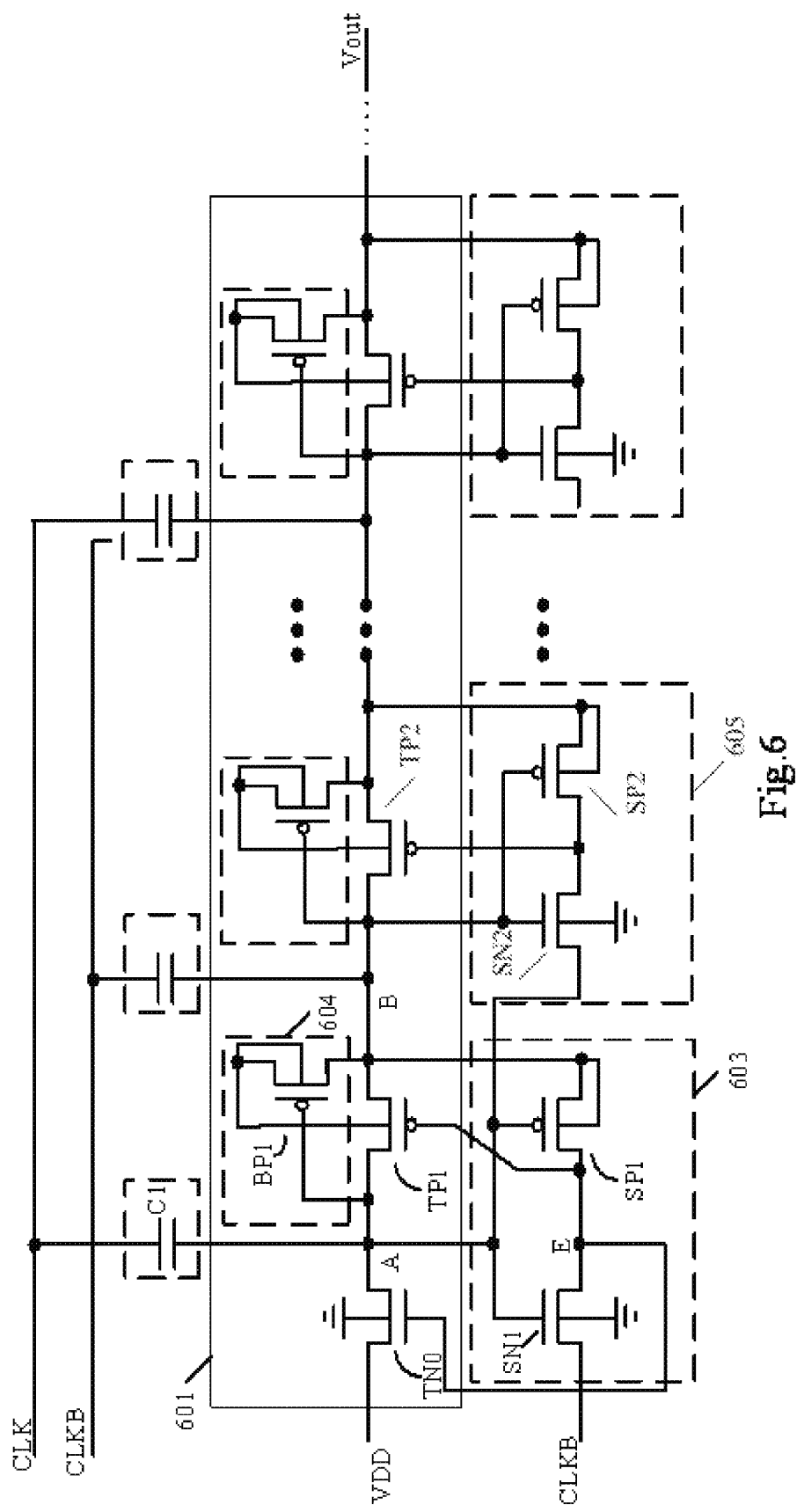

In another embodiment, each of the substrate bias unit can include a bias PMOS transistor. Referring to FIG. 6, the first substrate bias unit 604 includes a bias PMOS transistor BP1 matching with the first PMOS transistor TP1 in the switch unit 601. Where the gate of the bias PMOS transistor BP1 is coupled with the input terminal of the first PMOS transistor TP1 in the switch unit, the substrate and the input terminal of the bias PMOS transistor BP1 are coupled with the substrate of the TP1, and the output terminal of the bias PMOS transistor BP1 is coupled with the output terminal of the TP1.

When the point A is at a potential of VDD and the point B is at a potential which is three times the VDD, the bias PMOS transistor BP1 in the first stage of substrate bias unit 604 is turned on, and the substrate voltage of the first PMOS transistor TP1 in the switch unit 601 is biased to three times the VDD; when the point A is at a potential which is two times the VDD and the point B is also at a potential which is two times the VDD, the bias PMOS transistor BP1 in the first stage of substrate bias unit 604 is changed from turn-on to cut-off, so that when the first PMOS transistor TP1 in the switch unit 601 is in a cut-off or turn-on status, the substrate potential of the TP1 is correspondingly higher than the potential at the point B or the point A by a threshold voltage $V_{BP1}$ of turning on the PMOS transistor BP1. Therefore, the substrate voltage of the first PMOS transistor TP1 in the switch unit 601 is always kept at a high potential to thereby avoid the occurrence of leakage current between the source and drain and the substrate of the TP1. Similarly, each substrate bias unit works in a similar process to thereby avoid the occurrence of leakage current between the source and drain and the substrate of the corresponding PMOS transistor in the switch unit, which may influence transmission efficiency.

In another embodiment of the invention, there is further included an energy storage unit which is connected side by side with the output of the charge pump circuit and adapted to provide stably an output voltage.

Figure 7:
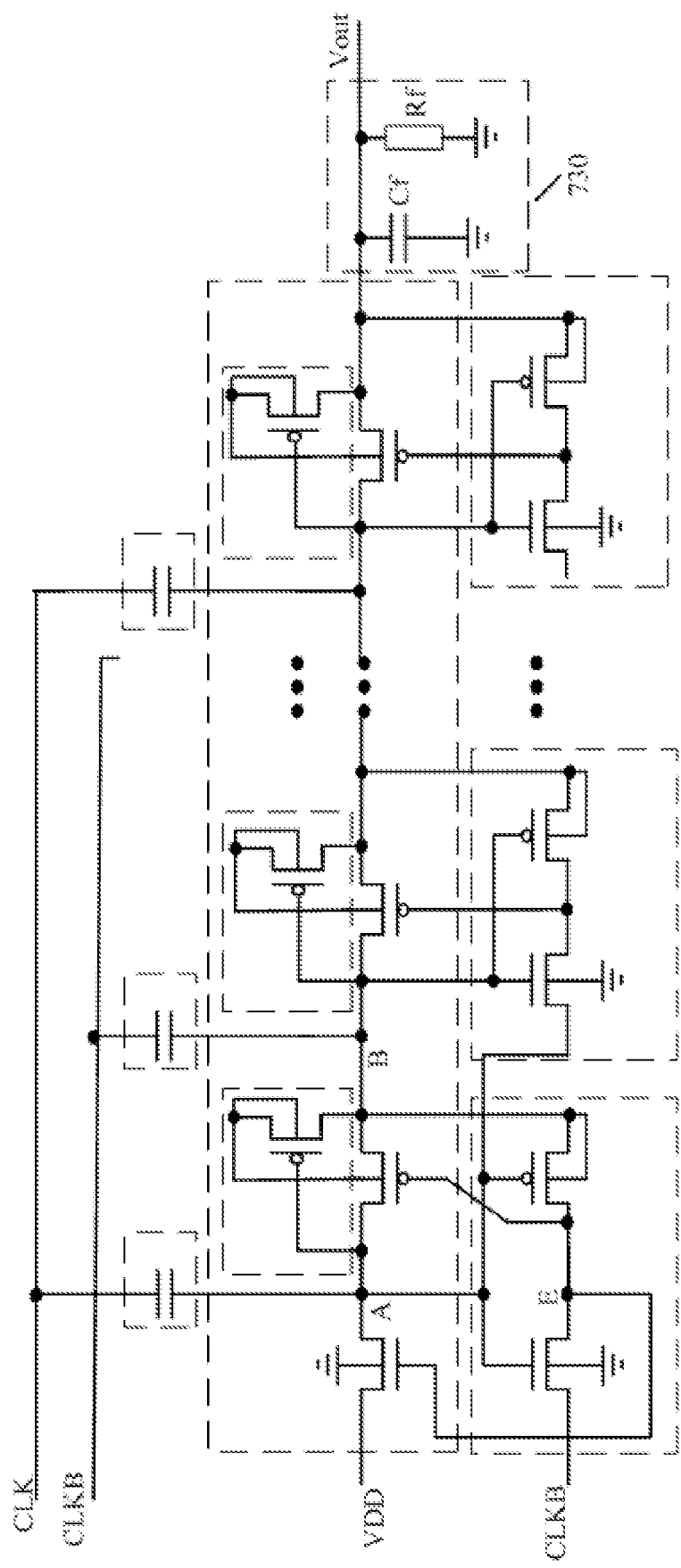

Specifically, referring to FIG. 7, the energy storage unit 730 can include a grounded capacitor Cf, and furthermore, the energy storage unit can further include a match resistance Rf coupled in parallel with the capacitor Cf In an alternative embodiment, the energy storage unit can further include a parallel combination of a plurality of grounded capacitors or a serial combination of a plurality of capacitors with one terminal grounded or a serial and parallel combination of grounded capacitors and a match resistance coupled in parallel with the combination of capacitors or a serial and parallel combination of match resistances. The circuit of the energy storage unit is well known to those skilled in the art and repeated descriptions thereof will be omitted here.

As compared with the prior art, in the circuit structure according to the embodiment of the invention, the combination of a first NMOS transistor and at least one PMOS transistor is adopted in the switch unit. On one hand, the first NMOS transistor is adopted to address the problem that the circuit may not work because the PMOS transistor fails to be turned on at the input of the circuit in the case of a low VDD, and on the other hand since the PMOS transistor is formed in an n-well of the P-type semiconductor substrate, the voltage in the well can be adjusted so that the substrate source voltage of the PMOS transistor will be made at 0V to ensure that the threshold of turn-on voltage will not increase along with the increasing serial number of stage of the charge pump, thereby ensuring normal transmission of charges, thus addressing the problem that even normal turn-on of the circuit may be influenced because the threshold voltage of the NMOS transistor may be approximate to the VDD along with the increasing serial number of stage of the charge pump. Therefore, the invention adopts the combination of one NMOS transistor and at least one PMOS transistor to ensure the turn-on voltage of the MOS transistor in the circuit to be two times the VDD and to address the problem of the threshold voltage being increased by the body effect.

Furthermore, in the circuit structure according to the embodiment of the invention, as illustrated in FIG. 6, an inverter structure is adopted for each stage of transmission sub-unit to control the corresponding MOS transistor in the switch circuit, for example, the inverter structure consists of the NMOS transistor SN1 and the PMOS transistor SP1 in the first stage of transmission sub-unit 603 is used to control the first NMOS transistor TN0 and the first PMOS transistor TP1 in the switch circuit 601, or the inverter structure consists of the NMOS transistor SN2 and the PMOS transistor SP2 in the second stage of transmission sub-unit 605 is used to control the PMOS transistor TP2 of the switch circuit 601, so that there will be no loss of threshold voltage during the transmission through each MOS transistor in the switch unit 601, thereby improving greatly efficiency of the charge pump circuit. Furthermore, for the MOS transistor in each stage of transmission sub-unit, the turn-on voltage thereof is also two times the VDD.

Consequently, it can be ensured that the respective MOS transistors will be provided with a high turn-on voltage when the charge pump circuit according to the embodiment of the invention works normally, and thus the respective MOS transistors can be turned on well even in the case of a low VDD, for example, when the chip is provided with a low source voltage, thereby ensuring normal work and high transmission efficiency of the entire circuit.

Figure 3:
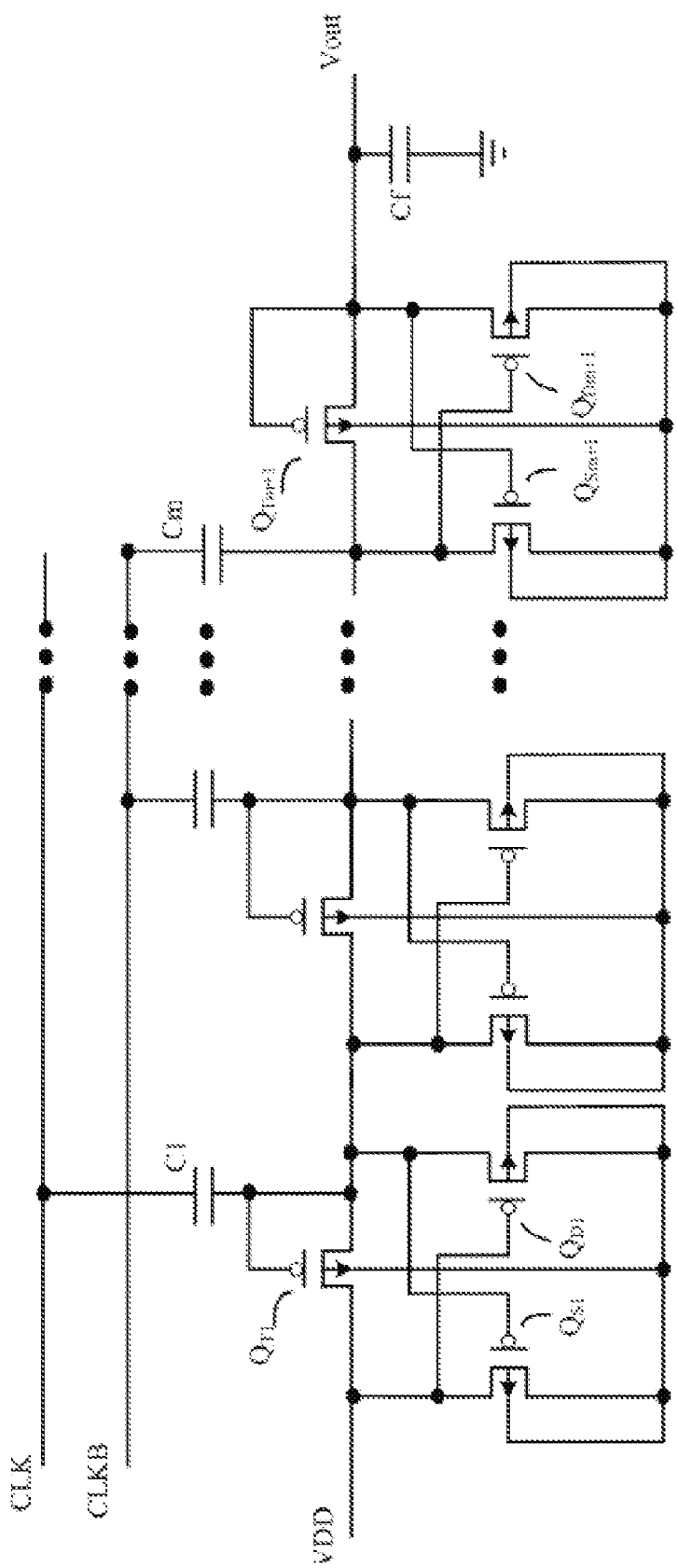
FIG. 3 illustrates a schematic diagram of another charge pump circuit known in the prior art.
Figure 8:
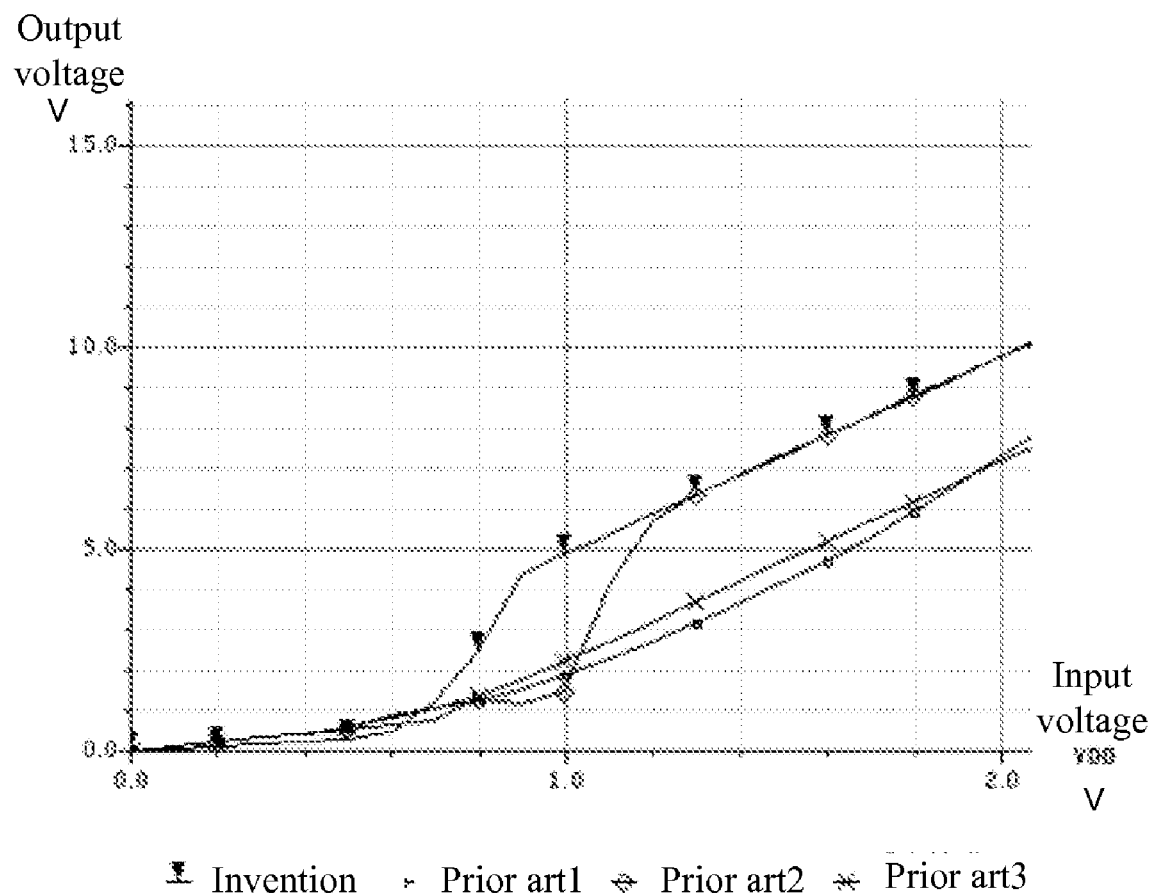
FIG. 8 illustrates a diagram of comparison of transmission effects of the charge pump circuit according to the embodiments of the invention and the prior arts.

As illustrated in FIG. 8, a diagram of comparison result between outputs of the charge pump circuits according to the embodiment of the invention and the prior arts is illustrated. The circuit of the prior art 1 is illustrated in FIG. 3, the prior art 3 relates to a Dickson circuit, and each switch unit in the circuit of the prior art 2 consists of the PMOS transistors and the rest thereof is illustrated in FIG. 7, which is similar to the embodiment of the invention.

During simulation, a simulation period of time is 50 μs, and the output of each circuit is read at an interval of 50 μs, in which, MOS transistors with the identical size, capacitors with the identical capacitor value, identical clock signals and source voltage VDD with the identical voltage are adopted in each circuit.

Referring to FIG. 8, it can be apparent seen when the input source voltage VDD is 1V that none of the prior art 1 to 3 can boost the voltage effectively. Furthermore, although the prior art 2 shows a good effect of boosting the voltage in the case of a large input voltage, for example, above 1.2V, the effect of boosting the voltage begins to be degraded rapidly when the VDD is below 1.2V, while the invention can still achieve a good effect even if the input voltage drops below 0.8V. Apparently, the charge pump circuit of the invention shows a superior capability of boosting the voltage over the prior arts, thus demonstrating sufficiently that the charge pump circuit can work well in the case of a low source voltage.

Although the invention has been disclosed with reference to the preferred embodiments thereof, the invention will not be limited thereto. Any those skilled in the art can make various variations and modifications without departing from the spirit and the scope of the invention, therefore the protection scope of the invention shall be as defined in the appended claims.

What is claimed is:

1. A charge pump circuit, comprising:
   a switch unit adapted to transmit charges from an input of the charge pump circuit to an output of the charge pump circuit and comprising a first NMOS transistor and at least two in-series coupled PMOS transistors, wherein an output terminal of the first NMOS transistor is coupled with an input terminal of the first PMOS transistor, an input terminal of the first NMOS transistor is the input of the charge pump circuit, and an output terminal of the last PMOS transistor is the output of the charge pump circuit;
   a transmission unit comprising at least two stages of transmission sub-units coupled in series, wherein the first stage of transmission sub-unit is adapted to control turn-on or cut-off of the first NMOS transistor and the first PMOS transistor in the switch unit, and other stages of transmission sub-units are sequentially in one-to-one correspondence with the other PMOS transistors in the switch unit and control turn-on or cut-off of the corresponding PMOS transistor, wherein each stage of transmission sub-unit comprises a first input, a second input, a third input and an output; in the first stage of transmission sub-unit, the first input is coupled with the input terminal of the first PMOS transistor and the output terminal of the first NMOS transistor in the switch unit, the second input is coupled with the output terminal of the first PMOS transistor in the switch unit, the third input is coupled with a first clock signal, and the output is coupled with the gate of the first NMOS transistor and the gate of the first PMOS transistor in the switch unit; and in the other stages of transmission sub-units, the first input is coupled with the input terminal of the corresponding PMOS transistor in the switch unit, the second input is coupled with the output terminal of the corresponding PMOS transistor in the switch unit, the third input is coupled with the first input of the preceding stage of transmission sub-unit, and the output is coupled with the gate of the corresponding PMOS transistor in the switch unit; and
   at least two stages of charging units adapted to store charges to boost a transmission voltage, wherein each stage of charging unit is in one-to-one correspondence with the corresponding PMOS transistor in the switch unit.

2. The charge pump circuit according to claim 1, wherein each stage of the charging unit has one terminal coupled with the input terminal of the corresponding PMOS transistor and the other terminal alternatively coupled with the first clock signal or a second clock signal.

3. The charge pump circuit according to claim 2, wherein the first clock signal and the second clock signal are anti-phase clock signals, and voltage peaks of the first clock signal and the second clock signal are the same as a value by which the transmission voltage is boosted.

4. The charge pump circuit according to claim 3, wherein in the charging units, the other terminal of each odd stage of charging units is coupled with the second clock signal, and the other terminal of each even stage of charging units is coupled with the first clock signal.

5. The charge pump circuit according to claim 3, wherein each stage of charging unit comprises a charging capacitor or a parallel combination of a plurality of charging capacitors or a serial combination of a plurality of charging capacitors or a serial and parallel combination of a plurality of charging capacitors.

6. The charge pump circuit according to claim 1, wherein each stage of transmission sub-unit at least comprises a sub-unit NMOS transistor and a sub-unit PMOS transistor; wherein the gate of the sub-unit PMOS transistor is coupled with the gate of the sub-unit NMOS transistor and acts as the first input of the transmission sub-unit; the substrate of the sub-unit PMOS transistor is coupled with the input terminal thereof and acts as the second input of the transmission sub-unit; the input terminal of the sub-unit NMOS transistor acts as the third input of the transmission sub-unit; the output terminal of the sub-unit NMOS transistor is coupled with the output terminal of the sub-unit PMOS transistor and acts as the output of the transmission sub-unit; and the substrate of the sub-unit NMOS transistor is grounded.

7. The charge pump circuit according to claim 1, wherein the switch unit further comprises substrate bias units, each of which is sequentially in one-to-one correspondence with the PMOS transistor in the switch unit and adapted to avoid presence of leakage current in the corresponding PMOS transistor.

8. The charge pump circuit according to claim 7, wherein each of the substrate bias units comprises a bias PMOS transistor, wherein the gate of the bias PMOS transistor is coupled with the input terminal of the corresponding PMOS transistor in the switch unit, the input terminal and the substrate of the bias PMOS transistor are coupled with the substrate of the corresponding PMOS transistor in the switch unit, and the output terminal of the bias PMOS transistor is coupled with the output terminal of the corresponding PMOS transistor in the switch unit.

9. The charge pump circuit according to claim 7, wherein each of the substrate bias units comprises a first bias PMOS transistor and a second bias PMOS transistor, wherein the gate of the first bias PMOS transistor and the output terminal of the second bias PMOS transistor are coupled with the output terminal of the corresponding PMOS transistor in the switch unit; the substrate and the input terminal of the first bias PMOS transistor and the substrate and the input terminal of the second bias PMOS transistor are coupled with the substrate of the corresponding PMOS transistor in the switch unit; and the output terminal of the first bias PMOS transistor and the gate of the second bias PMOS transistor are coupled with the input terminal of the corresponding PMOS transistor in the switch unit.

10. The charge pump circuit according to claim 1, further comprising an energy storage unit connected with the output of the charge pump circuit and adapted to provide stably an output voltage.

11. The charge pump circuit according to claim 10, wherein the energy storage unit comprises a grounded capacitor or a parallel combination of a plurality of grounded capacitors or a serial combination of a plurality of grounded capacitors with one terminal grounded or a serial and parallel combination of a plurality of grounded capacitors.

12. The charge pump circuit according to claim 11, wherein the energy storage unit further comprises a match resistance coupled in parallel with the capacitor or the combination of capacitors.

13. The charge pump circuit according to claim 1, wherein the input terminal of each MOS transistor is the source of each MOS transistor, and the output terminal of each MOS transistor is the drain of each MOS transistor, or the input terminal of each MOS transistor is the drain of each MOS transistor, and the output terminal of each MOS transistor is the source of each MOS transistor.

* * * * *